(12) United States Patent
Lin et al.

(10) Patent No.: US 7,653,164 B2
(45) Date of Patent: *Jan. 26, 2010

(54) ADAPTIVE IQ IMBALANCE CORRECTION FOR MULTICARRIER WIRELESS COMMUNICATION SYSTEMS

(75) Inventors: Jian Lin, San Jose, CA (US); Ernest Tsui, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 802 days.

This patent is subject to a terminal disclaimer.

(21) Appl. No.: 10/942,248

(22) Filed: Sep. 15, 2004

(65) Prior Publication Data

US 2006/0056554 A1 Mar. 16, 2006

Related U.S. Application Data (63) Continuation-in-part of application No. 10/038,860, filed on Dec. 31, 2001, now Pat. No. 7,167,513.

(60) Provisional application No. 60/503,514, filed on Sep. 15, 2003.

(51) Int. Cl.
*H04B 1/10* (2006.01)

(52) U.S. Cl. .................. 375/350; 375/136; 375/142; 375/143; 375/144; 375/145; 375/147; 375/149; 375/150; 375/152; 375/326; 375/335; 375/340; 375/345; 375/346; 375/347; 375/348; 375/349

(58) Field of Classification Search .......... 375/136, 375/142–145, 147, 149–150, 152, 326, 335, 375/340, 345–350

See application file for complete search history.

(56) References Cited

U.S. PATENT DOCUMENTS

| | | | | |
|---|---|---|---|---|
| 5,412,351 | A * | 5/1995 | Nystrom et al. | 332/103 |
| 5,949,821 | A * | 9/1999 | Emami et al. | 375/235 |
| 6,421,398 | B1 * | 7/2002 | McVey | 375/308 |
| 6,437,932 | B1 * | 8/2002 | Prater et al. | 360/46 |
| 6,442,217 | B1 * | 8/2002 | Cochran | 375/326 |
| 6,862,321 | B2 * | 3/2005 | Kaneko et al. | 375/296 |
| 2003/0007574 | A1 * | 1/2003 | Li et al. | 375/316 |
| 2003/0072393 | A1 * | 4/2003 | Gu | 375/322 |

(Continued)

FOREIGN PATENT DOCUMENTS

WO   WO 00/21238   4/2000

(Continued)

OTHER PUBLICATIONS

Schneier, *Applied Cryptograpy. Protocols, Algorithms and Source Code In C*, New York, John Wiley & Songs, pp. 256, 31-34, 52-56, 75-79, 480-481, XP002959192, ISBN: 0-471-11709-9, (1996).

(Continued)

*Primary Examiner*—Shuwang Liu
*Assistant Examiner*—Kabir A Timory
(74) *Attorney, Agent, or Firm*—Cool Patent, P.C.; Joseph P. Curtin (57) ABSTRACT

Embodiments of an adaptive in-phase (I) and/or quadrature-phase (Q) imbalance correction for multicarrier wireless communication systems is generally described.

7 Claims, 8 Drawing Sheets

U.S. PATENT DOCUMENTS

2003/0123534 A1     7/2003    Tsui et al.
2007/0058755 A1*   3/2007    Husted ...................... 375/332

FOREIGN PATENT DOCUMENTS

WO      WO 03/003686      1/2003

OTHER PUBLICATIONS

PCT/US2004/030572 Int'l Preliminary Report on Patentability Chapter 1 dated Mar. 23, 2006.

Schuchert et al—A Novel IQ Imbalance Compensation Scheme for the Reception of OFDM Signals—IEEE Transactions on Consumer Electronics vol. 47, No. 3 Aug. 2001 pp. 313-318 XP002217600—Section IV Extended Adaptive Frequency Domain Equalization.

Guanbin et al—Frequency Offset and I/Q Imbalance Compensation for OFDM Direct-Conversion Receivers—2003 IEEE International Conference on Acoustics, Speech, and Signal Processing Proceedings. (ICASSP) Apr. 6-10, 2003 vol. 1 of 6—April.

Chinese Office Action dated Apr. 3, 2009, in Chinese Patent Application No. 200480026312.4, 11 pages.

* cited by examiner

ADAPTIVE IQ IMBALANCE CORRECTION FOR MULTICARRIER WIRELESS COMMUNICATION SYSTEMS

CROSS-REFERENCE TO RELATED APPLICATIONS

The present application is a continuation-in-part of non-provisional patent application Ser. No. 10/038,860 entitled IQ Imbalance Correction filed on Dec. 31, 2001, by Lin, et al. (now U.S. Pat. No. 7,167,513) The present application also claims the benefit of provisional application No. 60/503,514 entitled Adaptive IQ Imbalance Correction for Multicarrier Wireless Communication Systems, filed on Sep. 15, 2003, by Lin et al Both of said patent applications are commonly assigned to the assignee of the present application. The disclosure of each of these applications and their progeny are expressly incorporated herein by reference.

TECHNICAL FIELD

Embodiments of the present invention are generally directed to wireless communication systems and, more particularly, to adaptive in-phase (I) and/or quadrature-phase (Q) correction for multicarrier wireless communication systems.

BACKGROUND

A multicarrier communication system such as, e.g., Orthogonal Frequency Division Multiplexing (OFDM), Discrete Multi-tone (DMT) and the like, is typically characterized by a frequency band associated with a communication channel being divided into a number of smaller sub-bands (subcarriers herein). Communication of content (e.g., data, audio, video, etc.) between stations in a multicarrier communication system is performed by transmitting the content using a select one or more of a number of overlapping subcarriers. By overlapping the subcarriers, the total number of subcarriers is increased within a given bandwidth, with a corresponding increase in channel throughput. To maintain the interference immunity between such overlapping subcarriers, the subcarriers are controlled to be mathematically orthogonal to one another, e.g., wherein the peak of one subcarrier is positioned at a frequency that represents a substantial null to adjacent subcarriers.

Wireless communication systems and associated standards are using increasingly use more sophisticated modulation techniques such as 64 QAM and OFDM (orthogonal frequency division multiplex) to increase communication channel throughput. The increased sensitivity of these more sophisticated modulation techniques to small imbalances between the In-phase (I) and Quadrature (Q) paths of a low cost direct-conversion receiver and/or transmitter becomes a significant issue. Phase mismatch occurs when phase difference between local oscillator signal for the In-phase and Quadrature channels is not exactly 90 degrees. Gain mismatch between I and Q channels result from mixer, filters, or analog to digital converter (ADC) as well as non-uniformity between the channels. In addition, the IQ imbalance caused by I and Q arm filter mismatch is likely to also be a function of frequency. In this regard, IQ imbalance may have frequency independent components, frequency dependent components and may also introduce image interference aliasing into the desired signal band which may interfere with channel estimation.

BRIEF DESCRIPTION OF THE DRAWINGS

Embodiments of various aspects of the present invention are illustrated by way of example, and not by way of limitation, in the following figures of the accompanying drawings in which like reference numerals refer to similar elements and in which.

DETAILED DESCRIPTION

Embodiments of an apparatus and method for adaptive IQ imbalance correction for multicarrier wireless communication systems are generally presented. More specifically, embodiments of the invention are directed to a unified approach for jointly estimating and minimizing transmitter and receiver IQ imbalance, while correcting for residual frequency and timing offsets. According to one embodiment, the technique is implemented with an adaptive filter that converges rapidly, adapts to temperature and aging effects, and is computationally relatively inexpensive, although the invention is not limited in this respect.

Reference throughout this specification to "one embodiment" or "an embodiment" means that a particular feature, structure or characteristic described in connection with the embodiment is included in at least one embodiment of the present invention. In this regard, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Other embodiments may incorporate structural, logical, electrical, process and other changes. Examples merely typify possible variations. Individual components and functions are optional unless explicitly required, and the sequence of various disclosed operations may vary without departing from the spirit and scope of the claimed invention.

Although various details of the claimed invention may be introduced within the context of a wireless local area network (WLAN) implementation, e.g., an 802.11a implementation, those skilled in the art will appreciate that the scope of the invention is not so limited. In this regard, aspects of the present invention may well be used to implement any of a number of wireless communication platforms such as, e.g., wireless local area network (WLAN), wireless personal area network (WPAN), wireless metro-area networks (WMAN), cellular networks, and the like.

Introduction

This disclosure models the effects of IQ imbalance due to both mixer and filter mismatches on OFDM systems and discusses how the remote transmitter and local receiver IQ imbalances can be jointly "balanced" adaptively with fast convergence for each individual packet. Jointly eliminating IQ imbalance in the transmitter and receiver is important to wireless high performance for future high-order QAM (64 and above) systems. Adaptive corrections account for different transmitters in ad hoc networks and allow for temperature and aging IQ variations with time. Frequency-dependent corrections are required for low-cost systems where complex analog matching circuits for in-phase and quadrature arm filters can be eliminated. The techniques described herein correct both constant (frequency-independent) and frequency-dependent IQ imbalance based on different sets of adaptive equalizers in the frequency domain. Jointly balancing of transmitter and receiver imbalance for frequency-dependent IQ effects is also a novel aspect of this work, although the scope of the invention is not limited in this respect.

Channel Model

Before detailing the various aspects of embodiments of the invention, it may be useful to lay out the mathematical models that illustrate the IQ imbalance problems introduced above.

As described above, IQ imbalance can be relatively constant over frequency (e.g., for mixer mismatch, etc.) or frequency dependent (e.g., for filter mismatch, etc.). Generally, in-phase and quadrature mixer mismatches are frequency independent. Mixer mismatch includes gain mismatch and phase mismatch between I and Q RF down/up-conversion channels. The phase deviation from the ideal 90 degrees between I and Q local oscillator signal causes I signal leakage to the Q channel and vice versa. Combining other constant IQ imbalances with the mixer imbalance, the resultant "channel" may be expressed mathematically as a 2×2 matrix:

$$H_{mixer} = \begin{bmatrix} H_{ii} & H_{iq} \\ H_{qi} & H_{qq} \end{bmatrix} = \begin{bmatrix} H_i \cos\alpha_i & H_i \sin\alpha_i \\ H_q \sin\alpha_q & H_q \cos\alpha_q \end{bmatrix} \quad [1]$$

Where $\alpha_i$, $\alpha_q$ are the mixer phase deviation from ideal and $H_i$, and $H_q$ are the I, Q channel gain factors, respectively.

In-phase and quadrature arm filter mismatches of the cutoff frequency, ripple, and group delay generally will be frequency dependent and causes image frequency interference, however it does not cause I(Q) leakage into Q(I). This filter mismatch can be expressed as:

$$H_{filter} = \begin{bmatrix} H_i(n) & 0 \\ 0 & H_q(n) \end{bmatrix} \quad [2]$$

The $H_{mixer}$ and $H_{filter}$ can express either transmitter or receiver, or a combination of both.

IQ Imbalance

Denote $i_{t,k}$, $q_{t,k}$ as the transmitted OFDM symbol in frequency domain. Let $i_{r,k}$, $q_{r,k}$ as the received OFDM symbol in frequency domain. The time domain signals are distorted by IQ imbalance, either in remote transmitter or local receiver. With this lexicon, the error due to IQ imbalance in the frequency domain will be evaluated, below.

For constant IQ imbalance, the received frequency domain signal $i_{r,k}$, $q_{r,k}$ can be expressed as $$\begin{bmatrix} i_{r,k} \\ q_{r,k} \end{bmatrix} = \begin{bmatrix} H_{ii} + H_{qq} & H_{iq} - H_{qi} \\ -H_{iq} + H_{qi} & H_{ii} + H_{qq} \end{bmatrix} \begin{bmatrix} i_{t,k}/2 \\ q_{t,k}/2 \end{bmatrix} + \begin{bmatrix} H_{ii} - H_{qq} & H_{iq} + H_{qi} \\ H_{qi} + H_{iq} & -H_{ii} + H_{qq} \end{bmatrix} \quad [3]$$

$$\begin{bmatrix} i_{t,-k}/2 \\ q_{t,-k}/2 \end{bmatrix}$$

If there is no IQ imbalance, $H_{ii}=H_{qq}$, $H_{iq}=H_{qi}=0$, then $i_{r,k}=i_{t,k}$, $q_{r,k}=q_{t,k}$. Thus, it can be seen from equation [3] that constant IQ imbalance has two effects. The first term shows transmitted signal has been scaled and rotated by imbalance. The second term shows mirror image frequency interference.

Consider IQ distortion caused by filter mismatch between $H_i(n)$ and $H_q(n)$, the in-phase and quadrature low pass filter, respectively. If, $h(k)=FFT(H(n))$, then:

$$\begin{bmatrix} i_{r,k} \\ q_{r,k} \end{bmatrix} = \begin{bmatrix} h_i(k) + h_q(k) & 0 \\ 0 & h_i(k) + h_q(k) \end{bmatrix} \begin{bmatrix} i_{t,k}/2 \\ q_{t,k}/2 \end{bmatrix} + \quad [4]$$

$$\begin{bmatrix} h_i(k) - h_q(k) & 0 \\ 0 & -h_i(k) + h_q(k) \end{bmatrix} \begin{bmatrix} i_{t,-k}/2 \\ q_{t,-k}/2 \end{bmatrix}$$

That is, equation [4] may be read to show that the filter IQ imbalance also has two effects, like the case of constant IQ imbalance. However, because filter IQ imbalance is a function of frequency, each frequency (or subcarrier) suffers a different distortion. This understanding is important to understanding the solutions described below.

Model of the Effects of OFDM Channel Estimation and Correction on the Signal

In many implementations, e.g., an 802.11x OFDM implementation, channel estimation is often based on an OFDM preamble training signal. In this conventional channel estimation, the calibrator treats all observable distortions as channel including the IQ effects. Channel corrections derived from the training signal are applied to the entire received signals to compensate for the multipath channel frequency characteristics. In an 802.11a implementation, for example, the "long preamble" is the training signal for channel estimation. The 802.11a standard defines the long preamble tone as:

$L_{-26,0}$={1, 1, −1, −1, 1, 1, −1, 1, −1, 1, 1, 1, 1, 1, 1, −1, −1, 1, 1, −1, 1, −1, 1, 1, 1, 1, 0}

$L_{26,1}$={1, 1, 1, −1, −1, 1, 1, −1, 1, −1, 1, −1, −1, −1, −1, −1, 1, −1, 1, −1, 1, 1, −1, −1, 1}

The long preamble tones can be formed into two classes. In one class, both signal and its mirror image have same phases, $L_k=L_{-k}$ in long preamble. In another class, signal and it mirror image have a pi ($\pi$) phase difference, $L_k=-L_{-k}$ in long preamble. Recall from equation [3], IQ imbalance distortion for frequency k will depend on the particular signal value at image frequency -k. Therefore, if constant IQ imbalance exists, channel correction coefficients will fall into two classes even with an ideal channel. When the channel corrections are applied to the entire received signals, the two classes of distortions will appear and will require separate compensation. Conventional approaches to IQ imbalance correction often deal with this effect as a combined effect, and smoothes to remove. In this regard, such conventional practices may be seen as a macro-level approach that tries to mitigate the effects of the IQ imbalance. In contrast, embodiments disclosed herein attempt to analyze, characterize and then remove each of the components of the IQ imbalance, while compensating for frequency offset and timing deviations (i.e., channel induced errors), i.e., a micro-level approach when compared with conventional techniques.

In this regard, embodiments of the invention are generally directed to an architecture and associated methods to recover the transmitted signal $i_{t,k}$, $q_{t,k}$ from the received signal $i_{r,k}$, $q_{r,k}$. Towards this end, architectures and associated methods to identify and correct for frequency independent IQ imbalance, frequency dependent IQ imbalance, and to compensate for the effect of channel corrections in a signal is detailed, below.

Example Communication System

Figure 1:
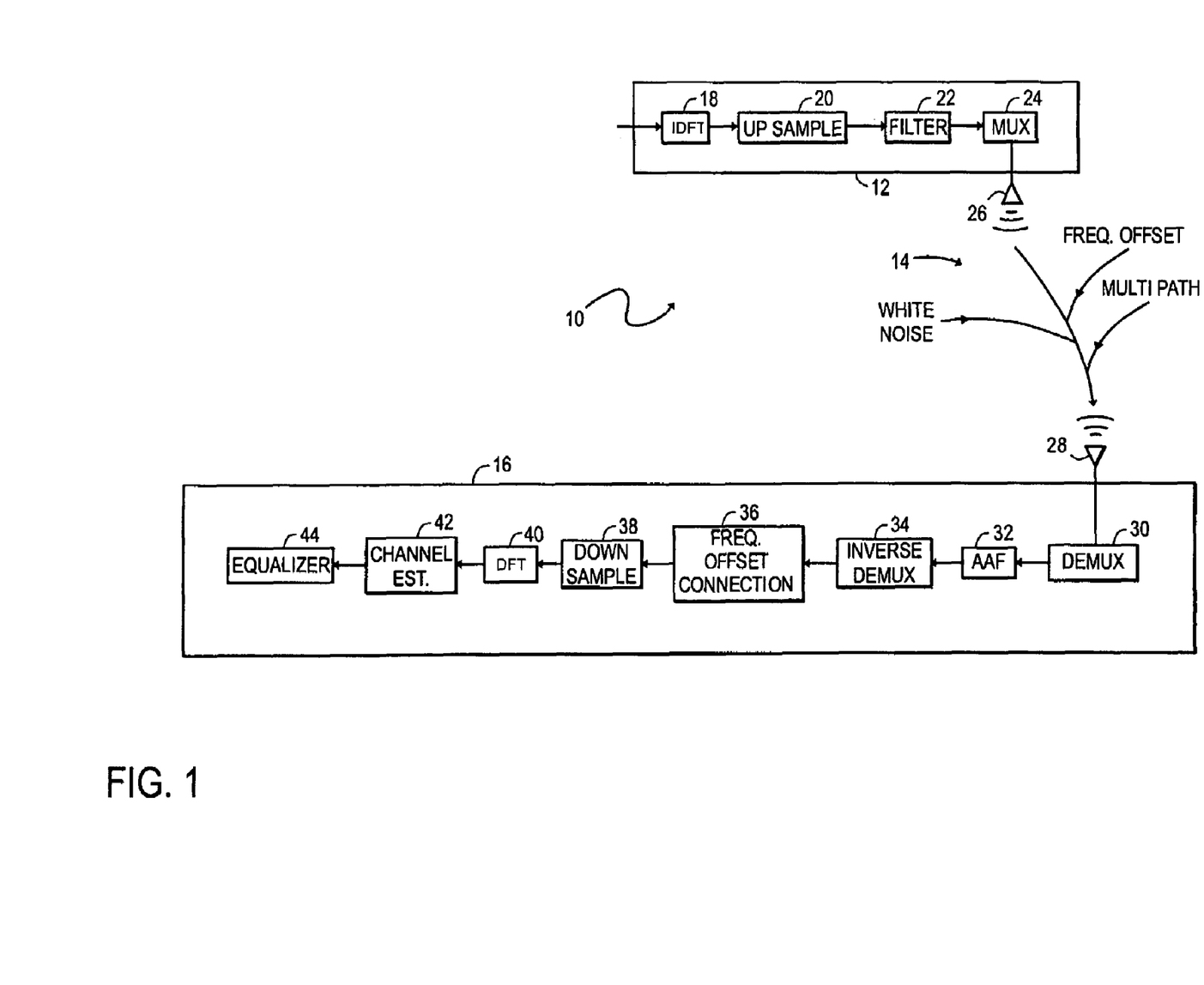
FIG. 1 shows an example data communication system according to an example embodiment.

Turning to FIG. 1, an example communication transmission system 10 within which embodiments of the invention may be practiced is introduced, according to but one example embodiment. In accordance with the illustrated example embodiment of FIG. 1, system 10 is depicted comprising one or more of a remote transmitter 12, a transmission channel 14, and a local receiver 16. In accordance with but one example embodiment, transmitter 12 may include one or more of an inverse discrete Fourier transform (IDFT) block 18. According to the illustrated example embodiment, IDFT block may implement an inverse fast Fourier transform IFFT) that may generate a time-domain representation of an input signal containing the symbols to be transmitted. The IFFT block 18 may provide this time-domain representation to an up-sampler 20, the output of which may be filtered by a transmitter filter 22. The output of the transmit filter 22 is then provided to a multiplexer 24 that modulates each subcarrier with one or more of the symbols to be transmitted. As introduced above, multiplexer 24 may represent one source of IQ imbalance error.

From the multiplexer 24, the subcarriers radiate from a select one or more of transmitting antenna(e) 26 and enter the transmission channel 14. Along the way, the subcarriers may encounter additional sources of distortion. For example, reflections from obstacles can result in multipath errors. In some cases, the frequencies of the subcarriers may be shifted causing intersymbol interference (ISI), and the like.

A receiving antenna 28 at receiver 16 captures at least a subset of the subcarriers of channel 14, together with any white noise in the environment and any other interfering signals. This compilation of signals may then be passed to a demultiplexer 30, which may introduce another source of IQ imbalance error.

The output of the demultiplexer 30 may then be passed to an anti-alias filter 32 and then to an inverse demultiplexer 34, whose function is to remove any IQ imbalance introduced by the demultiplexer 30. The resulting signal is then provided to a frequency-offset-correction block 36 to correct IQ imbalance resulting from frequency-offset errors that exist because of any mismatches between the resonant frequency of an oscillator at the local receiver and the corresponding resonant frequency of an oscillator at the remote transmitter.

The output of the frequency-offset-correction block is then sampled by a down-sampler 38 and provided to a discrete Fourier transform block 40. In accordance with the illustrated example embodiment of FIG. 1, DFT block 40 implements a fast Fourier transform, although the invention is not limited in this regard. The DFT block 40 provides a frequency-domain representation of the signal to a channel-estimation-and-correction block 42 that removes errors resulting from multipath along the transmission channel 14. This results in a received signal that, except for any residual IQ imbalance errors, is essentially identical to the input signal provided to the remote transmitter 12.

Figures 2, 3:
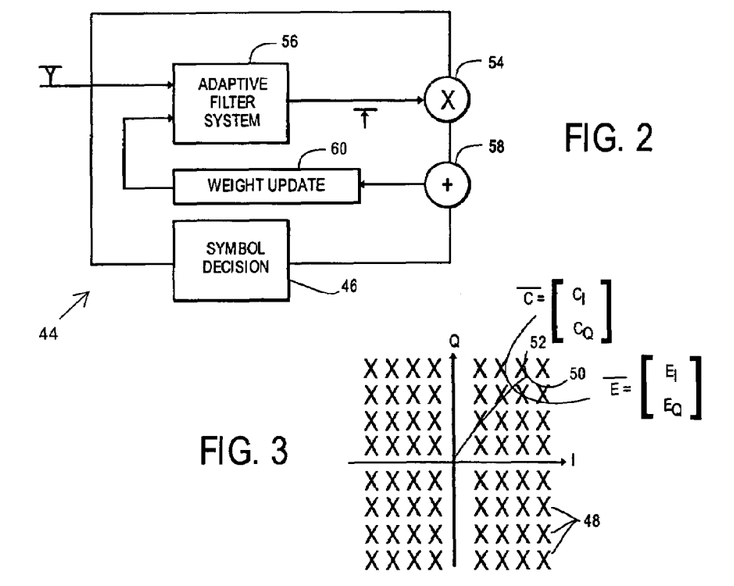
FIG. 2 shows an example equalizer according to one aspect of an example embodiment.
FIG. 3 shows points in an IQ plane according to one embodiment.

The received signal is provided to an equalizer 44, an example of which is shown in more detail in FIG. 2. Within the equalizer 44 the received signal is provided to a symbol-decision block 46. The symbol-decision block 46 then determines the constellation point in the IQ plane that lies closest, in a Euclidean sense, to the received point in the IQ plane.

Although depicted as a number of disparate functional elements coupled to process signals in an example sequence, those skilled in the art will appreciate that significant modification to the described architecture and/or the signal processing order may well be made without deviating from the spirit and scope of the claims below.

Turning briefly to FIG. 3, an example IQ plane having constellation points 48 distributed throughout four quadrants is depicted, according to one example embodiment. These constellation points 48 represent the possible symbols that are understood by the data transmission system 10. Also shown in FIG. 3 is a received point 50 corresponding to the received signal. As a result of IQ imbalance error, the received point 50 does not coincide with any of the constellation points 48. Nevertheless, there does exist a constellation point 52 that lies nearest to the received point 50 in the IQ plane. This nearest constellation-point 52 is defined by a two-dimensional constellation vector c having components $c_I$ and $c_Q$ representative of in-phase and quadrature components of the nearest constellation-point 52. This nearest constellation-point 52, which is assumed to correspond to the symbol that the received point 50 attempts to communicate, forms the output of the symbol-decision block 46.

FIG. 2 provides a block diagram of an example equalizer 44 architecture, according to one embodiment of the invention. As shown, the equalizer 44 may include one or more adaptive filter system(s) 56, to be discussed more fully below, responsive to weight update element(s) 60 and symbol decision element 46 through summing and/or multiplication nodes, as depicted. As introduced above, and developed more fully below, equalizer 44 corrects for IQ imbalance introduced as a result of transmit and receive processing, as well as offsets introduced in frequency and time through the communication channel 14.

Figure 4:
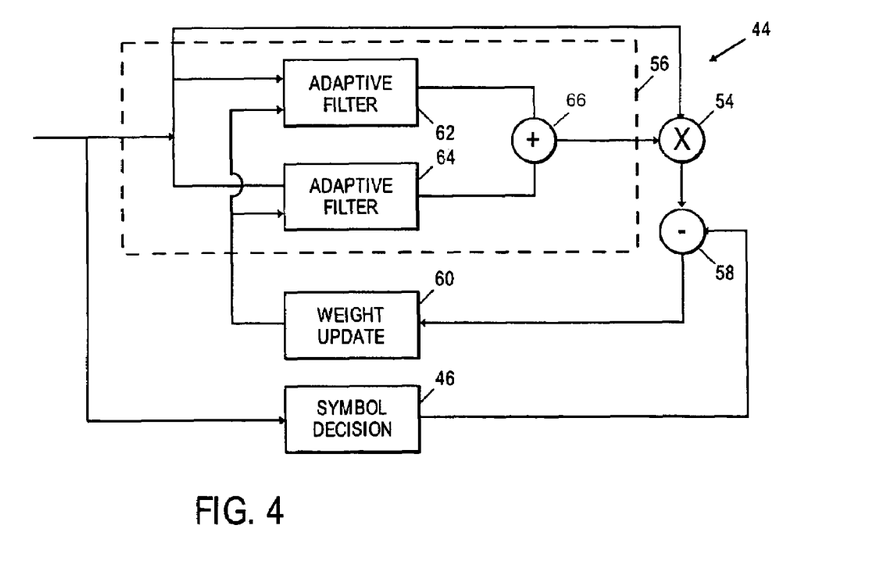
FIG. 4 shows an example adaptive filter suitable for use in accordance with one embodiment.

With reference to FIGS. 2 and 4, the received signal is also provided to a multiplier 58, which combines it with the output of an adaptive-filter system (56). The output of the adaptive-filter system (56), which can be represented as a 2×2 composite equalizing-matrix "W", is selected such that the equalized signal provided at the output of the multiplier 54 approximates the input to the remote transmitter 12. The reason the equalizing matrix is a "composite" equalizing-matrix will be apparent from the discussion of FIG. 3, above.

A differencing element 58 receives the equalized signal and the nearest constellation-point 52 from the symbol-decision block 46. The output of the differencing element 58 is an error signal indicative of the difference between these two quantities. This difference is characterized in FIG. 3 by a two-dimensional error vector M, having components $M_I$ and $M_Q$ representative of in-phase and quadrature components, that characterizes the extent of the IQ imbalance. This error signal is then provided to a weight-update block 60.

The weight-update block 60 then determines a new composite equalizing-matrix that, when used to generate another equalized signal, further reduces the magnitude of the error signal. The output of the weight-update block 60 is then provided back to the adaptive-filter system 56, which then replaces its composite equalizing-matrix with a new composite equalizing-matrix as provided by the weight-update block 60. This new composite equalizing-matrix is then used to generate a new equalized signal. The process continues until the magnitude of the error signal reaches a minimum or a pre-defined threshold. The error signal thus functions as a feedback signal for adjusting the composite equalizing-matrix on the basis of the extent to which the equalized signal differs from the nearest constellation-point 52.

FIG. 4 shows an example adaptive-filter system 56, according to one embodiment. In particular, FIG. 4 illustrates how the adaptive filter system uses both the positive and negative frequency components of the received signal to generate the composite equalizing-matrix. The adaptive-filter system 56 includes a first adaptive filter 62 for generating a positive-frequency equalizing-matrix from the positive frequency components of the received signal and a second adaptive filter 64 for generating a negative-frequency equalizing-matrix from the negative-frequency components of the received signal. The positive-frequency equalizing-matrix and the negative-frequency equalizing-matrix are then provided to a summer 66, the output of which is the composite equalizing-matrix.

Within the weight-update block 60, the four weighting coefficients that make up the composite equalizing-matrix are updated by incrementing the previous weighting coefficients by an amount proportional to the corresponding error signal and to the received signal. The constant of proportionality is selected to control the speed of convergence. A constant chosen to ensure rapid convergence is apt to result in an unstable system. Conversely, a constant chosen to ensure a stable system is apt to converge slowly.

In some cases, the IQ imbalance error is so great that the received signal does not correspond to the closest constellation point in the IQ plane. Multipath in the transmission channel can, in many cases, cause IQ imbalance errors of this magnitude. In some embodiments, the local receiver includes a channel-estimation-and-correction block 42 to correct these errors.

In the specialized case in which the data conforms to the IEEE 802.11a standard, the method carried out by a conventional channel-estimation-and-correction block 42 interferes with the operation of the equalizer 44. For example, to correct for multipath errors, the 802.11a standard provides a training signal that includes a pair of training bits for each subcarrier. One of the pair of training bits is associated with the positive frequency component of that subcarrier; the other is associated with the negative frequency component of that subcarrier. For half of the subcarriers, these training bits have the same sign. For the remaining half of the subcarriers, these training bits have different signs.

To accommodate this disparate treatment of different subcarriers in the training signal, the equalizer segregates the subcarriers into two classes and processes them separately. The first class includes those subcarriers for which the corresponding training bits in the training signal have the same sign. The second class includes those subcarriers for which the corresponding training bits in the training signal have different signs. IQ imbalance errors for symbols carried by subcarriers in both the first and second classes are corrected in the manner described above. Segregating subcarriers into two classes in this manner prevents the multipath correction performed on the first class from interfering with convergence of an equalizing matrix for subcarriers in the second class, and vice versa.

Figure 5:
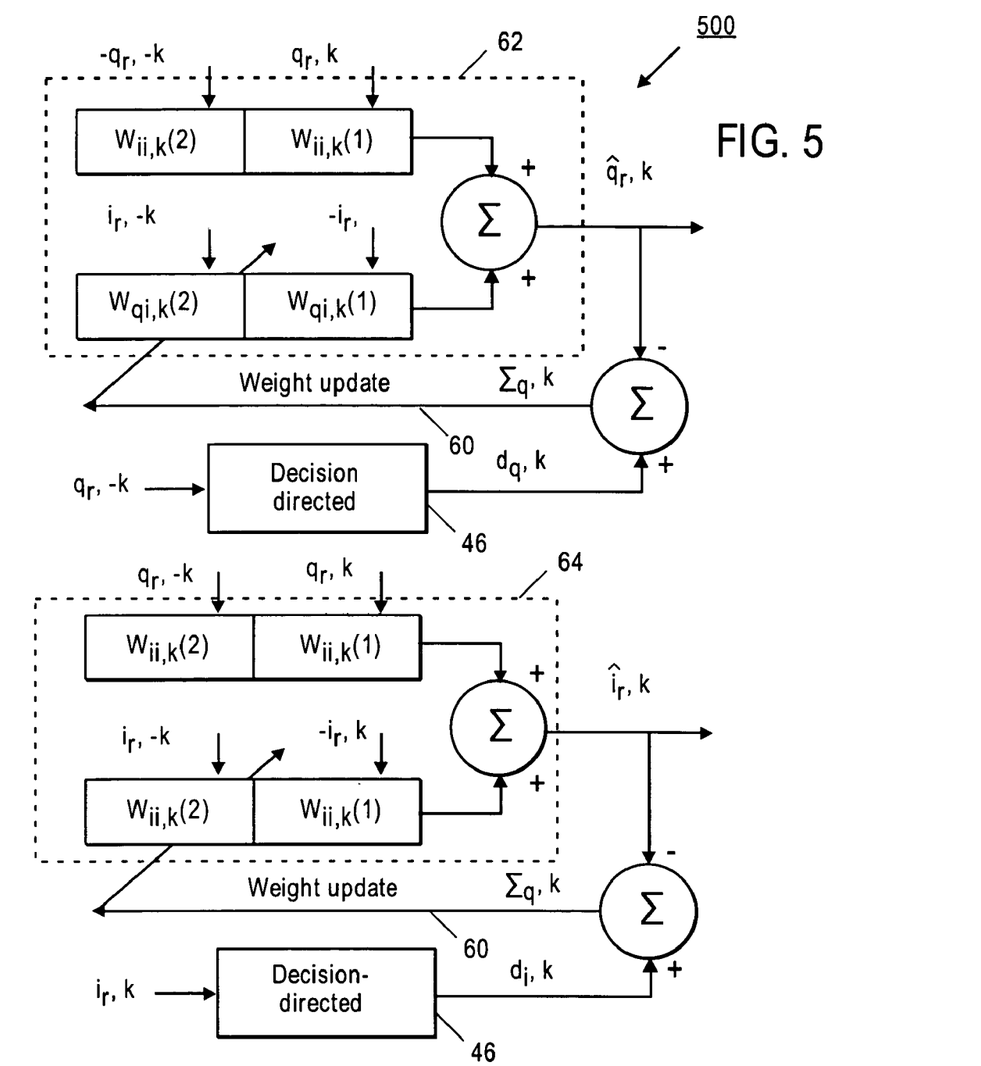
FIG. 5 illustrates a block diagram of an example adaptive filter architecture, according to one embodiment.

FIG. 5 is a block diagram depicting an example adaptive filter architecture, according to one example embodiment. As shown, a filter element 62 is responsive to input from a weight update 60 and symbol decision 46 through one or more summation elements. According to one embodiment, such as the one depicted in FIG. 2, two equalizers 62 (e.g., represented in FIG. 2 as 62 and 64) may be used, one for the in-phase branch and another for the quadrature processing branch.

From equation [3] solving for the transmitted signals as a function of the received signals in the frequency domain provides:

$$\begin{bmatrix} i_{t,k} \\ q_{t,k} \end{bmatrix} = \frac{1}{2(H_{ii}H_{qq} - H_{iq}H_{qi})} \left( \begin{bmatrix} H_{ii} + H_{qq} & -H_{iq} + H_{qi} \\ H_{iq} - H_{qi} & H_{ii} + H_{qq} \end{bmatrix} \begin{bmatrix} i_{r,k} \\ q_{r,k} \end{bmatrix} - \begin{bmatrix} H_{ii} - H_{qq} & H_{iq} + H_{qi} \\ H_{qi} + H_{iq} & -H_{ii} + H_{qq} \end{bmatrix} \begin{bmatrix} i_{r,-k} \\ q_{r,-k} \end{bmatrix} \right) \quad [5]$$

$$= \begin{bmatrix} W_{ii(1)} & -W_{qi(1)} \\ W_{qi(1)} & W_{ii(1)} \end{bmatrix} \begin{bmatrix} i_{r,k} \\ q_{r,k} \end{bmatrix} + \begin{bmatrix} W_{ii(2)} & W_{qi(2)} \\ W_{qi(2)} & -W_{ii(2)} \end{bmatrix} \begin{bmatrix} i_{r,-k} \\ q_{r,-k} \end{bmatrix}$$

If the two W matrices can be determined, then $i_{t,k}, q_{t,k}$ can be recovered. Formulating this as a mean-square error minimization of the detected signals leads to an adaptive technique to correct IQ imbalance. As provided in FIG. 5, the I equalizer will update its weight $W_{ii,k}$ for each updated input signal and copy updated weight $W_{qi,k}$ from Q equalizer and the Q equalizer will update its weight $W_{qi,k}$ for each new input signal and copy updated weight $W_{ii,k}$ from I equalizer. The output $\hat{i}_{t,k}$ and $\hat{q}_{t,k}$ are the estimations of $i_{t,k}$ and $q_{t,k}$. The weight adapts according to the least mean square (LMS) error criterion by the LMS algorithm.

$$\hat{i}_{t,k} = W_{ii,k}(1)i_{r,k} + W_{ii,k}(2)i_{r,-k} - W_{qi,k}(1)q_{r,k} + W_{qi,k}(2)q_{r,-k}$$

$$\hat{q}_{t,k} = W_{qi,k}(1)i_{r,k} + W_{qi,k}(2)i_{r,-k} + W_{ii,k}(1)q_{r,k} - W_{ii,k}(2)q_{r,-k}$$

$$W_{ii,k}(1) = W_{ii,k}(1) + \epsilon_{i,k}\mu i_{r,k}$$

$$W_{ii,k}(2) = W_{ii,k}(2) + \epsilon_{i,k}\mu i_{r,-k}$$

$$W_{qi,k}(1) = W_{qi,k}(1) + \epsilon_{q,k}\mu q_{r,k}$$

$$W_{qi,k}(2) = W_{qi,k}(2) + \epsilon_{q,k}\mu q_{r,-k}$$

$$\epsilon_{i,k} = d_{i,k} - i_{r,k}$$

$$\epsilon_{q,k} = d_{q,k} - q_{r,k} \quad [6]$$

where $d_{i,k}$ and $d_{q,k}$ are decision-directed output of $i_{r,k}$ and $q_{r,k}$, respectively.

For frequency independent IQ imbalance, $W_{ii,k}$ and $W_{qi,k}$ are both constant for all frequencies k. Therefore, only one set of adaptive equalizers is needed. Equalizer weights are updated for each new signal.

Compensation of Channel Correction

As discussed above, channel estimation treats IQ imbalance as effective "channel". IQ imbalance also has impact on channel estimation, which can also degrade channel correction. The impacts of channel correction are equivalent to modify the weights in equation [5]. In the case of 802.11a, channel correction coefficients will fall into two classes as discussed in above.

Figure 6:
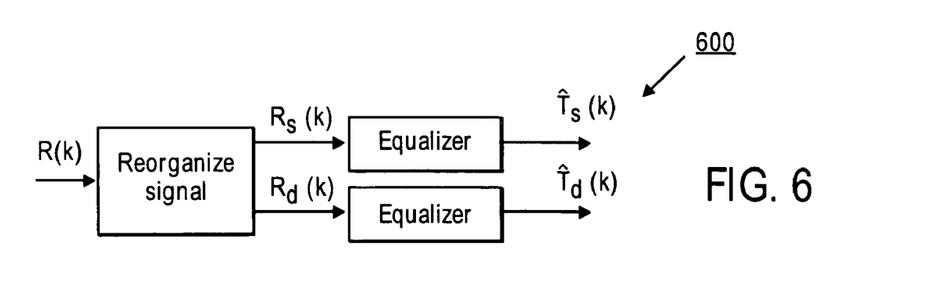
FIG. 6 illustrates an example equalizer architecture to improve channel estimation, according to one embodiment.

The two-set adaptive equalizer approach may be used to address this problem. The signal after channel correction is organized into two classes and each class is processed separately. The first class includes signal carried by those frequencies for which the corresponding bits in the long preamble have same signs as their image frequencies. The second class includes signal carried by those frequencies for which the corresponding bits in the long preamble have different signs as their image frequencies. Two classes signal are processed by two sets of equalizers, as shown by FIG. 6. $R_s(k)$ and $R_d(k)$ denote two classes signal while $\hat{T}_s(k)$ and $\hat{T}_d(k)$ are their estimations.

Separating the signal into two classes in this manner prevents the channel correction performed on one class from interfering with convergence of the equalizer for a signal in the other class. According to one embodiment, the architecture of FIG. 6 solves the problem by, first, the channel estimation technique (e.g., using the long preamble signal as is done normally) and, second, use of the 802.11a SIGNAL symbol to concurrently estimate the IQ parameters and equalize the IQ imbalance. The result is a more direct and timely estimation and compensation algorithm (e.g., without square roots, etc.) for IQ imbalance. In addition, no specific training sequence tone modulation sequences between image and direct frequencies are required to remove the effects of the imbalance.

Equalizer Training Using the 802.11a "SIGNAL" Symbol

Figure 9:
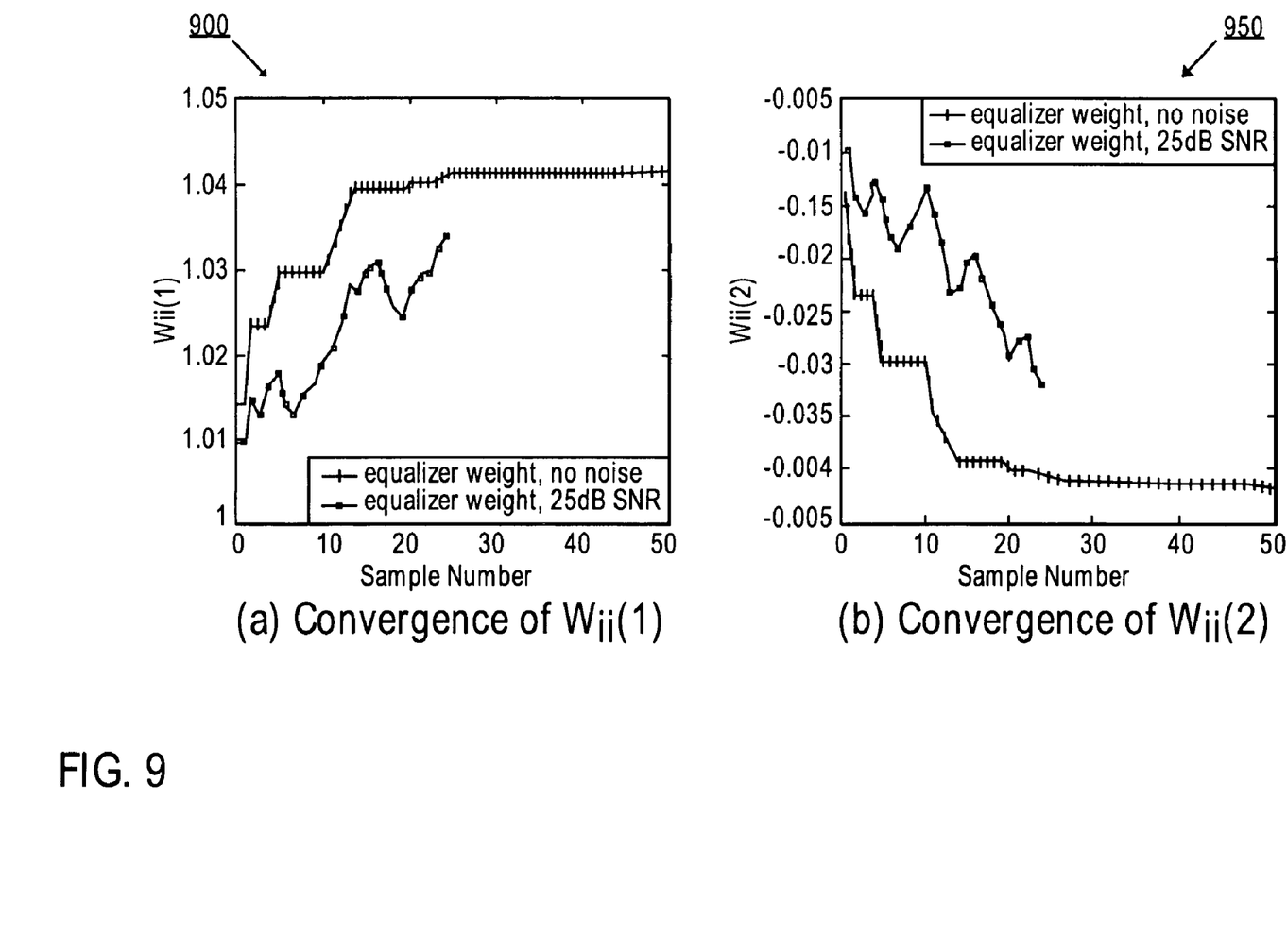
FIG. 9 graphically illustrates example convergence performance according to one embodiment.

An adaptive method that adjusts for IQ distortion per packet necessarily requires some time to obtain convergence. Generally OFDM signal formats have a pre-amble or a control signal that conveys information about the modulation and coding format to the receiver. For example, the IEEE 802.11a standard specifies a 4 micro-second OFDM symbol, denoted as the "SIGNAL" symbol, which is transmitted immediately after the long preamble via BPSK modulation. Due to the BPSK modulation, a decision-directed approach to update the IQ correction weights can be employed since errors will be minimized by the BPSK modulation. Therefore, the weights can be applied to all higher modulated OFDM data symbols without being updated during the packet. This will not only minimize the effect of decision errors via data symbols but also conserve on the operations to update the equalizer. The convergence behavior for two of the weights is shown in FIG. 9.

To avoid decision-directed error propagation, the equalizers used to correct frequency independent IQ imbalance are adapted only during SIGNAL symbol (a symbol for which management and control information is transmitted on BPSK only in the 11a standard). Each equalizer has only 24 samples or 4 µseconds (at 20 Msps) to update its weights. This requires the equalizers to converge or almost converge at the end of SIGNAL symbol. To speed up the convergence, the µ value for MMSE equalizer is set to 0.1 for the first 5 samples, then step down to 0.05, and then down to 0.01 after 12 samples. FIG. 9 shows equalizer convergence speed.

As shown in the Figure, the $W_{ii}(1)$ and $W_{ii}(2)$ approach to theoretic values. The theoretic (noise-free) values show a mixer mismatch with the I branch phase deviation at 10° and gain factor deviation at 10%. The weights of equalizers shown in FIG. 9 at the end of SIGNAL symbol (at the 24 sample) show a correction for a mixer mismatch, whose I branch phase deviation is 8.6° and gain factor is 7.7%. The correction does not fully correct IQ imbalance, but is good enough. The remaining IQ imbalance distortion is then corrected by 48 sets of equalizers, which is used to correct frequency dependent IQ imbalance which will be discussed in the below. Note the decrease of the rms error by 10 dB due to the correction of the frequency-dependent I/Q imbalance by the 48 equalizers.

Approach for Frequency Dependent IQ Imbalance Correction

Figure 7:
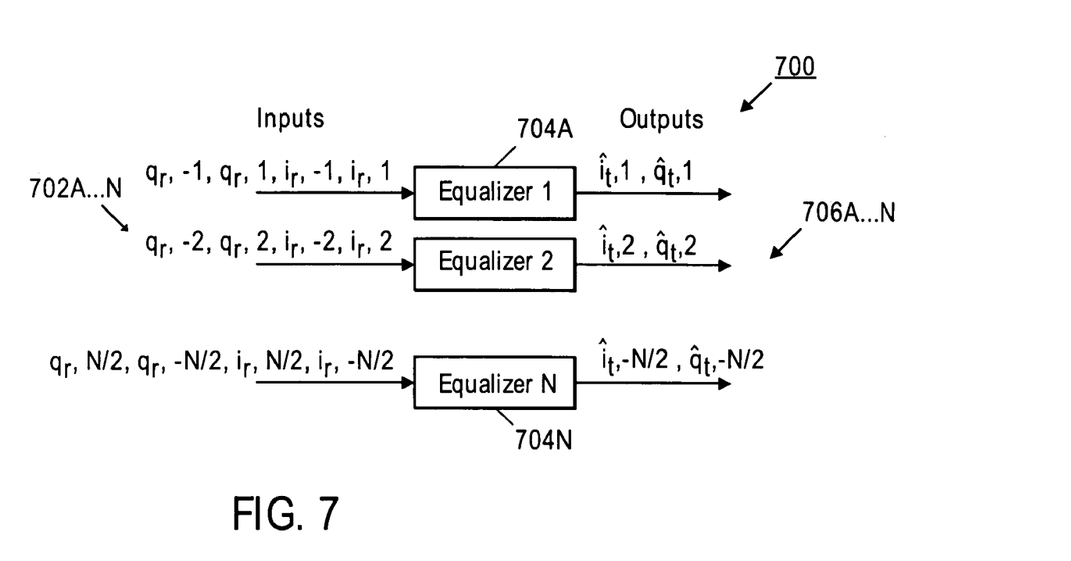
FIG. 7 depicts an example approach for frequency dependent IQ imbalance correction, according to one embodiment.

For frequency dependent IQ imbalance, $W_{ii,k}$ and $W_{qi,k}$ are both functions of frequency k. Therefore, the previously discussed design using either one set or two sets of adaptive equalizers do not work sufficiently well. Instead, every frequency k needs to have a unique adaptive equalizer and thus a total of N adaptive equalizers (where N is the number of data bearing frequencies or subcarriers) are required. The weights $W_{ii,k}$ and $W_{qi,k}$ are updated for each OFDM symbol. FIG. 7 shows an example architecture suitable for this purpose.

Approach to Correct Both Constant and Frequency Dependent IQ Imbalance

Figure 8:
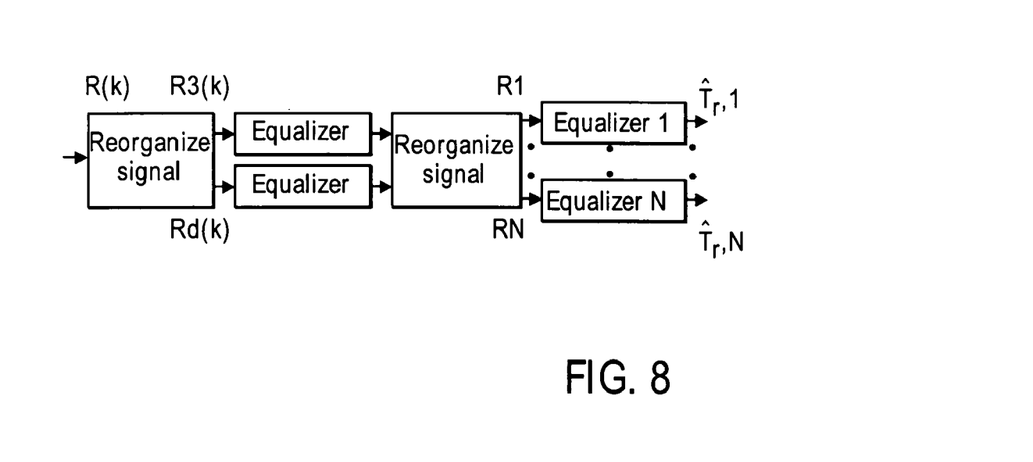
FIG. 8 illustrates an example unified approach to frequency dependent and frequency independent IQ imbalance correction that accommodates frequency and timing offsets in channel estimation, according to one embodiment.

The approach shown in FIG. 6 can be used to correct both constant and frequency dependent IQ imbalance, but it does not take advantage of "SIGNAL symbol. The limitation to update of the weights only once every OFDM symbol results in a long convergence time. Another approach is to combine the two set equalizer approach with an N-set equalizer approach by converging the two set equalizer across the 48 tones of the SIGNAL Symbol to remove the IQ imbalance constant or bias term and then removing the frequency dependent effects using symbols in addition to the SIGNAL symbol. FIG. 8 shows an example architecture in support of such an approach. Rs(k) and Rd(k) denote two classes signal, discussed in previous section.

Finally, note that the frequency-domain compensation improves over the time-domain approach of conventional techniques, which allows frequency-dependent corrections.

Computational Burden of the General Frequency Dependent IQ Imbalance Approach

The equalizers to correct frequency-independent IQ imbalance need update their weights only during SIGNAL symbol. Two sets equalizer update their weights 24 times, respectively. The equalizers to correct frequency-dependent IQ imbalance need update their weights during data symbols. During data symbols, 48 sets equalizer update weights once per OFDM symbol. Equation 6 shows to update a single subcarrier equalizer once requires 8 multiplies and 4 adds and to correct a single subcarrier requires 6 multiplies and 6 adds. The following table (Table 1) summarizes the computation burden. A single multiplier running at 300 MHz is sufficient to execute the required multiplies.

TABLE 1

| | Computation Burden | | |
|---|---|---|---|
| | Weights update | | |
| | SIGNAL symbol | Data symbol | Data correction |
| 2 set equal. | 288 mul. | 0 | 384 mul. |
| | 192 add | | 288 add |
| 48 set equal. | 0 | 288 mul | 384 mul. |
| | | 192 add | 288 add. |

Simulation Analysis

To illustrate the effect of IQ imbalance and the performance of the proposed IQ imbalance correction approach, an OFDM system was modeled and simulated. The system parameters were set based on the specification of IEEE 802.11a standard for wireless LANs. Simulations were performed for AWGN only and also for an AWGN plus multipath channel. The effects of residual frequency and timing offsets were also included to show performance in real-life situations. Data modulation for all data tones was assumed to be 64QAM. Severe mixer mismatch was assumed which included an I branch phase deviation of 100 and a gain factor mismatch of 10%. The imbalance was assumed to be completely in the transmitter (worse case), but could be distributed between the transmitter and local receiver. The Q branch signal was left unchanged. A Sixth-order Chebyshev type-I low-pass filter was used with In-phase filter cutoff frequency of 0.905 of the sampling frequency and ripple was 1.05 dB (±0.5025 dB). When there was a filter mismatch, Q branch filter had a cutoff frequency of 0.900 of the sampling rate and 1.00 dB ripple.

Figure 10:
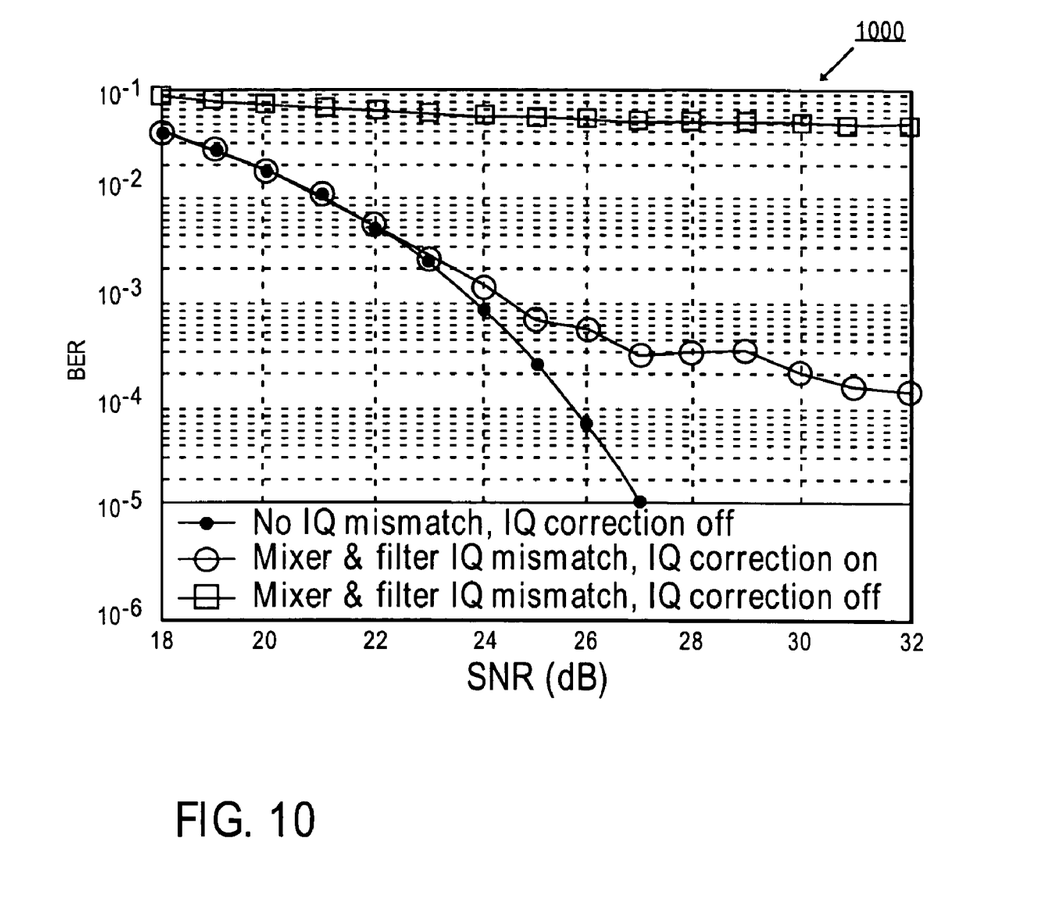
FIG. 10 graphically illustrates example performance characteristics for combined mixer and filter mismatch correction, according to one embodiment.

FIG. 10 show simulation results for un-coded 64QAM for AWGN channel. The performance with IQ correction is always better with such correction than without. More particularly, FIG. 10 shows the performance for combined filter and mixer mismatch correction. Note that the uncoded curve eventually shows deviations from ideal. However, at the low error rates at which this happens, the decoding will essentially yield sufficiently low error decoded error rates.

Figure 11:
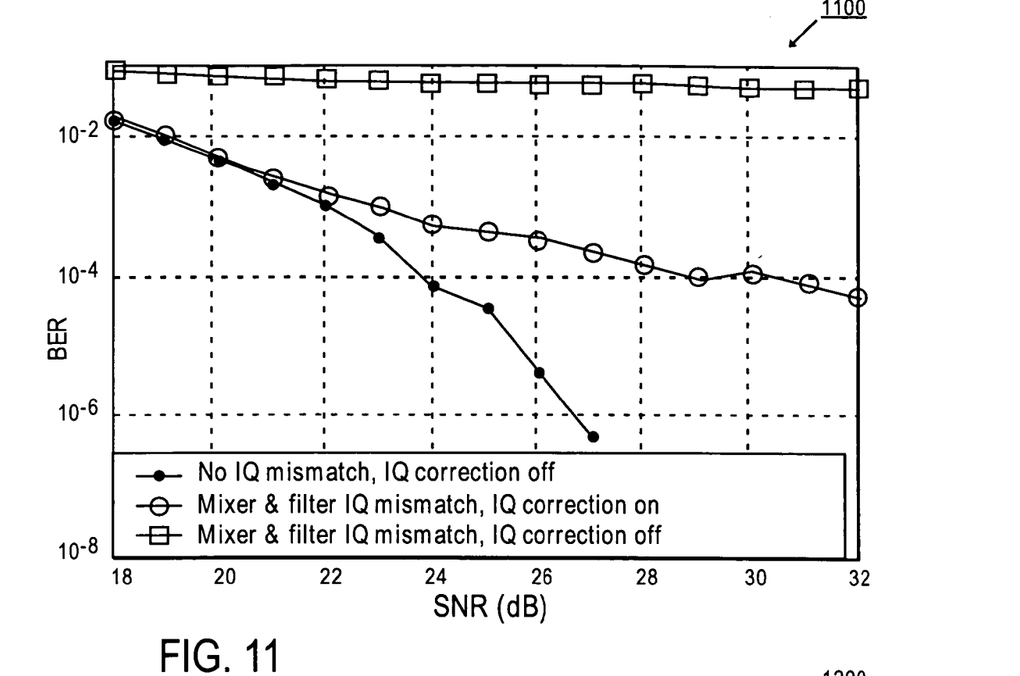
FIG. 11 illustrates example performance characteristics for combined imbalance correction in a multipath channel, according to one embodiment.

FIG. 11 shows simulation results for un-coded 64QAM with the addition of multipath. An example multipath was assumed consisting of 5 paths with a 0 dB path at 0 ns, −17.5 dB at 50 ns delay, −28.6 dB at 100 ns, −37.6 dB at 150 ns, and −50.3 dB at 200 ns. Good performance is obtained similar to the results for AWGN noise only in FIG. 10.

Figure 12:
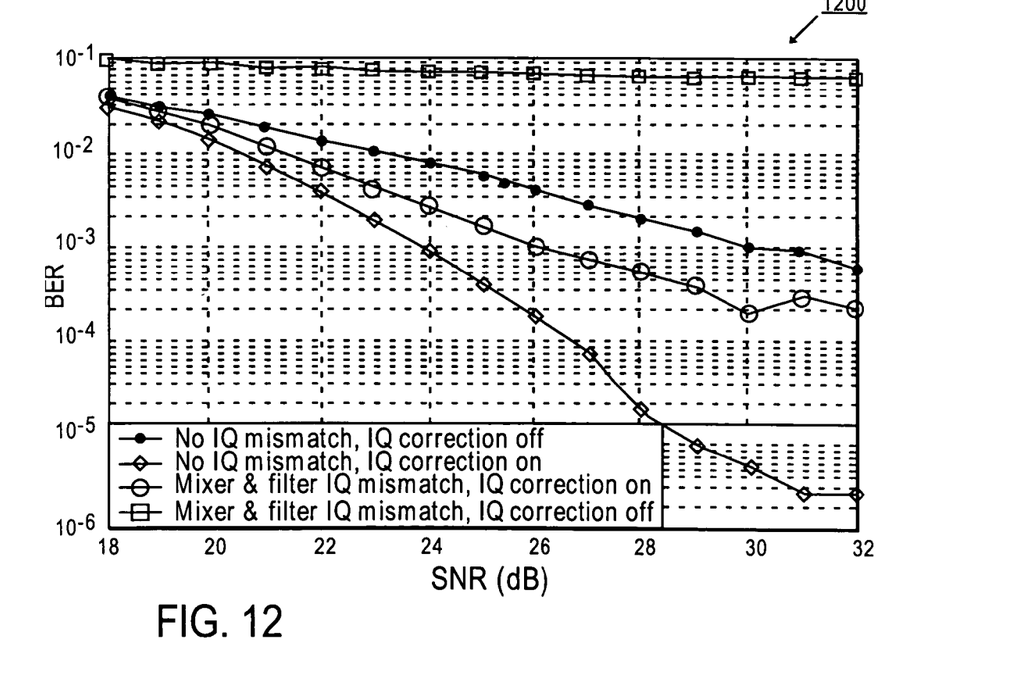
FIG. 12 illustrates example performance characteristics for combined imbalance correction in a multipath channel with a significant frequency offset, according to one embodiment.

FIG. 12 shows the effects considered above with the addition of a significant frequency offset of ~40 ppm (208 kHz). Most of the offset is corrected by automatic frequency control (AFC) loops but a residual error remains of ~4.2 kHz at the start of the I/Q correction. The solid diamond curve shows the effects of just residual frequency offset which degrade the OFDM demodulation severely via the phase shifting of the QAM constellation points but the use of the IQ correction results in the bottom curve (open diamond curve) for an excellent performance improvement due to the good phase tracking abilities of the adaptive filters. The addition of IQ mismatch to the impairment list results in severe performance degradation (top curve of open boxes) and this is again corrected to the open oval curve by the adaptive filters.

Figure 13:
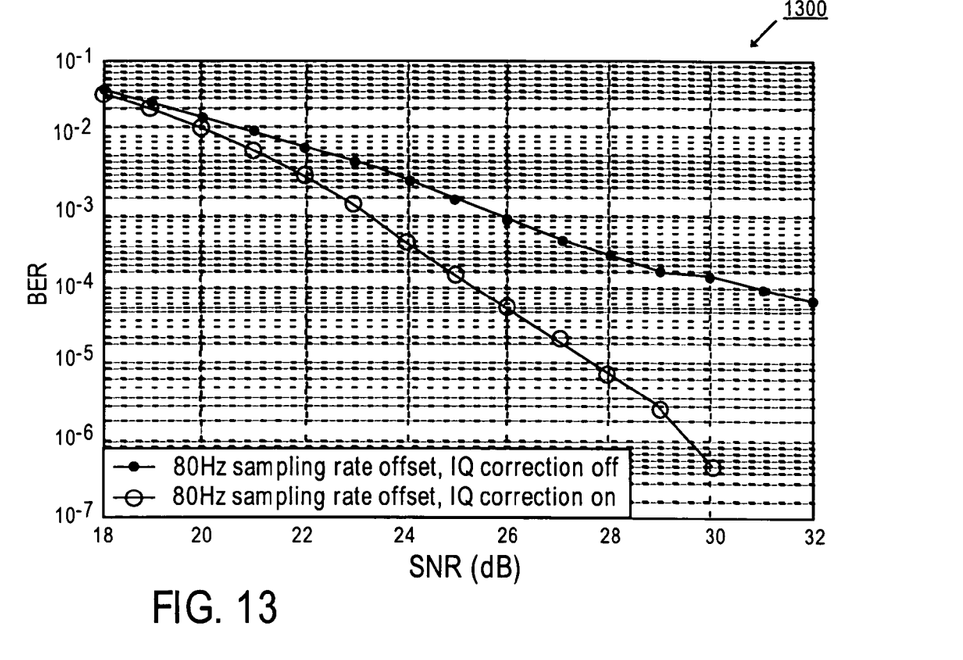
FIG. 13 depicts example performance characteristics for combined imbalance correction with a sampling rate offset, according to one embodiment.

FIG. 13 shows the effects of having A/D sampling frequency offsets with no other impairments except for AWGN. Again, the adaptive IQ equalizer performance is robust enough to correct for as much as an 80 Hz sampling rate offset (2 ppm for 40 Msps A/D sampling rate).

Figure 14:
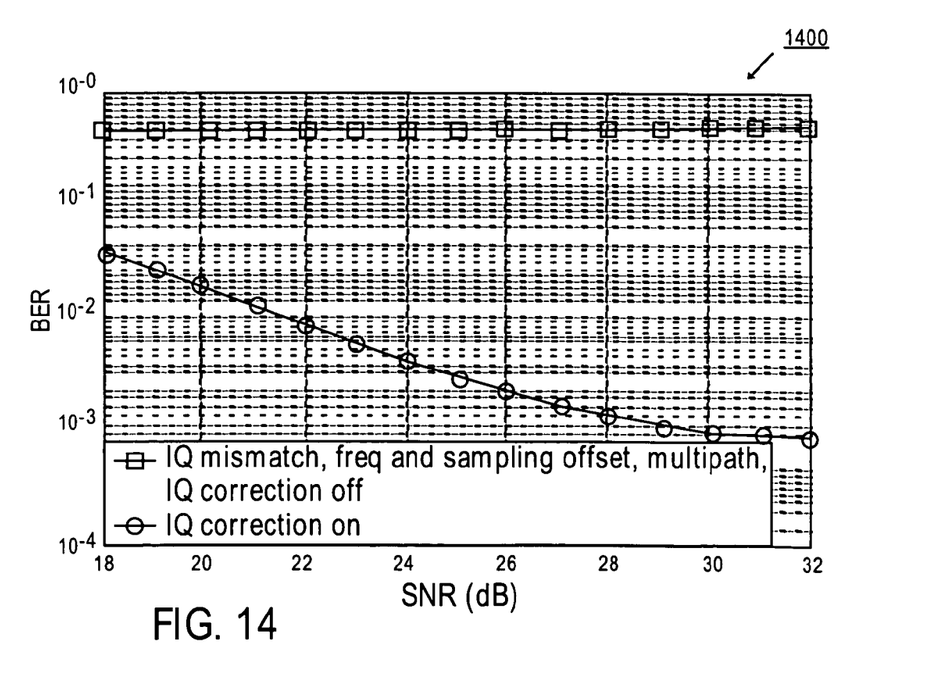
FIG. 14 depicts example performance characteristics for combined imbalance correction with residual frequency and sampling rate offsets in a multipath channel, according to one embodiment.

In FIG. 14, as a final simulation, all the significant impairments were added to the simulator and the performance without IQ correction was predictably very poor (open squares curve). IQ Correction was then invoked and the open oval curve was the result. Again, the performance is significantly improved even to the point that with the error correction decoding, AWGN noise only performance is approached (refer to FIG. 10).

IQ imbalance can cause large degradations in an OFDM receiver. It scales and rotates transmitted signal and results in image interference aliasing into the desired signal band. Channel estimation can also increase deleterious IQ imbalance effects. In this paper, a novel IQ imbalance correction approach is introduced which implements frequency-domain adaptive equalization. The approach can correct both constant and frequency-dependent IQ imbalance. It has a good performance even under degraded channel correction. Adaptive equalizers adjust IQ imbalance drift with temperature and aging. The approach jointly corrects transmitter and receiver IQ imbalance. The approach can correct channel estimation errors so that it performs better even without IQ mismatches.

The present invention includes various operations. The operations of the present invention may be performed by hardware components, such as those shown in FIGS. 1 and/or 2, or may be embodied in machine-executable content (e.g., instructions) 702, which may be used to cause a general-purpose or special-purpose processor or logic circuits programmed with the instructions to perform the operations. Alternatively, the operations may be performed by a combination of hardware and software.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A receiver comprising:
   an I/Q imbalance estimator for estimating frequency dependent and frequency independent IQ imbalance error of a received OFDM signal in combination with channel-induced error; and
   an adaptive filter system in communication with said I/Q imbalance estimator for generating one or more equalizing transformations for independently reducing an effect of the frequency dependent and frequency independent IQ imbalance error;
   wherein said adaptive filter system comprises:
      a first equalizer system for reducing an effect of the frequency independent IQ imbalance wherein the first equalizer system is adapted to generate a first transformation on the basis of a first portion of a spectrum of said received OFDM signal and a second transformation on the basis of a second portion of said spectrum; and
      a second equalizer system for reducing an effect of the frequency dependent IQ imbalance wherein the second equalizer system comprises N adaptive equalizers where N corresponds to a number of data bearing frequencies or subcarriers of the received OFDM signal spectrum, or combinations thereof.

2. The receiver of claim 1, further comprising a mixer in communication with said adaptive filter system for applying said equalizing transformation to said received signal.

3. The receiver of claim 2, wherein the second portion includes image frequency components of said spectrum.

4. The receiver of claim 3, wherein said second portion includes negative frequency components of said spectrum.

5. The receiver of claim 1, further comprising a weight-update block in communication with said adaptive filter system and said I/Q imbalance estimator, said weight-update block being configured to update weighting coefficients of said adaptive filter system on the basis of an error signal provided by said I/Q imbalance estimator.

6. A transmitter comprising:

an I/Q imbalance estimator for estimating frequency dependent and frequency independent IQ imbalance error in combination with channel-induced error; and an adaptive filter system in communication with said I/Q imbalance estimator for generating an equalizing transformation for reducing an effect of the frequency dependent and frequency independent IQ imbalance error independently;

wherein said adaptive filter system comprises a first adaptive filter for generating a first transformation on the basis of a first portion of a spectrum of said OFDM signal and a second adaptive filter for generating a transformation on the basis of a second portion of said spectrum.

7. The transmitter of claim 6, wherein said second adaptive filter is configured to receive a second portion that includes image frequency components of said spectrum.

* * * * *

UNITED STATES PATENT AND TRADEMARK OFFICE
CERTIFICATE OF CORRECTION

PATENT NO. : 7,653,164 B2  Page 1 of 1
APPLICATION NO. : 10/942248
DATED : January 26, 2010
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1463 days.

Signed and Sealed this

Twenty-eighth Day of December, 2010

David J. Kappos
*Director of the United States Patent and Trademark Office*